US012025080B2

(12) United States Patent
Sanchez-Concha

(10) Patent No.: US 12,025,080 B2
(45) Date of Patent: Jul. 2, 2024

(54) DEVICE FOR THE TREATMENT AND ELIMINATION OF BACTERIA IN HYDROCARBON FUELS AND PROCESS FOR ITS MANUFACTURE AND SURFACE ACTIVATION

(71) Applicant: Rodrigo Coquis Sanchez-Concha, Lima (PE)

(72) Inventor: Rodrigo Coquis Sanchez-Concha, Lima (PE)

( * ) Notice: Subject to any disclaimer, the term of this patent is extended or adjusted under 35 U.S.C. 154(b) by 247 days.

(21) Appl. No.: 15/526,923

(22) PCT Filed: Nov. 25, 2016

(86) PCT No.: PCT/PE2016/000022
§ 371 (c)(1),
(2) Date: May 15, 2017

(87) PCT Pub. No.: WO2017/116240
PCT Pub. Date: Jul. 6, 2017

(65) Prior Publication Data

US 2018/0106222 A1 Apr. 19, 2018

(30) Foreign Application Priority Data

Dec. 31, 2015 (PE) ........................ 002712-2015/DIN

(51) Int. Cl.
*F02M 27/02* (2006.01)
*C22C 13/02* (2006.01)
(Continued)

(52) U.S. Cl.
CPC ............. *F02M 27/02* (2013.01); *C22C 13/02* (2013.01); *C22C 30/02* (2013.01); *C22C 30/04* (2013.01);
(Continued)

(58) Field of Classification Search
CPC ....... F02M 35/10078; F02M 35/10118; F02M 35/10288; F02M 35/116; F02B 75/22
(Continued)

(56) References Cited

U.S. PATENT DOCUMENTS 4,429,665 A 2/1984 Brown
4,715,325 A * 12/1987 Walker .................. F02M 25/00 123/1 A
(Continued)

FOREIGN PATENT DOCUMENTS

CA 2272294 A1 * 6/1998 .......... B01J 23/6445
GB 2248132 4/1992
(Continued)

OTHER PUBLICATIONS

International Search Report (in Spanish) related to PCT/PE2016/000022, dated Feb. 28, 2017 (4 pgs.).
(Continued)

*Primary Examiner* — John M Zaleskas
(74) *Attorney, Agent, or Firm* — Husch Blackwell LLP

(57) ABSTRACT

This invention consists of a device for the treatment and elimination of bacteria in combustible hydrocarbons, whose function is to ensure the purity of said fuels. The elimination of bacteria takes place catalytically thanks to the alloy of which its inner part is composed and the interaction with the casing containing it. This device has the advantage of having a more intense effect of eliminating microbiological contamination than other technologies. It is installed inside the fuel tanks. Its design allows that its presence in the tank does not cause damage to the components that may be inside it.

12 Claims, 6 Drawing Sheets

1

Figure 1:
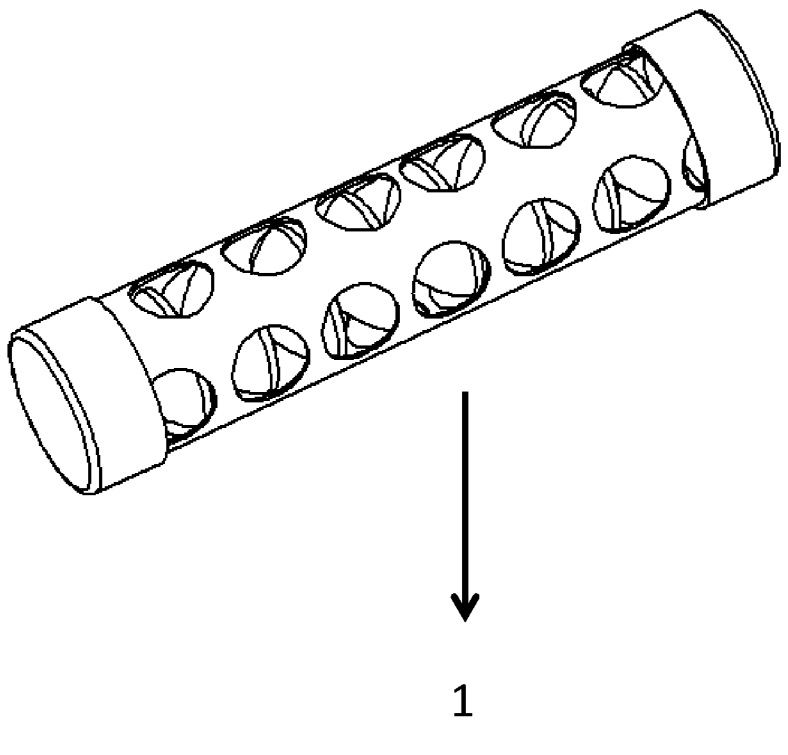

(51) Int. Cl.

| | |
|---|---|
| ***C22C 30/02*** | (2006.01) |
| ***C22C 30/04*** | (2006.01) |
| ***C22C 30/06*** | (2006.01) |
| ***C22F 1/00*** | (2006.01) |
| ***C22F 1/16*** | (2006.01) |
| *C22C 38/00* | (2006.01) |
| *C22C 38/16* | (2006.01) |
| *C22C 38/60* | (2006.01) |
| *F02M 27/04* | (2006.01) |

(52) U.S. Cl.

CPC ................ *C22C 30/06* (2013.01); *C22F 1/00* (2013.01); *C22F 1/002* (2013.01); *C22F 1/16* (2013.01); *C22C 38/008* (2013.01); *C22C 38/16* (2013.01); *C22C 38/60* (2013.01); *F02M 27/045* (2013.01)

(58) Field of Classification Search

USPC ............ 123/184.24, 184.31, 184.34, 184.47, 123/184.53

See application file for complete search history.

(56) References Cited

U.S. PATENT DOCUMENTS 4,820,422 A * 4/1989 Spencer .................... C02F 1/48 210/696
4,832,837 A * 5/1989 Frederick ............. B01D 17/045 210/153
4,930,483 A * 6/1990 Jones ..................... F02M 27/02 123/538
5,044,347 A * 9/1991 Ullrich ................... F02M 33/00 123/536
5,048,499 A * 9/1991 Daywalt ................ F02M 27/00 123/1 A
5,154,153 A * 10/1992 MacGregor ............ F02M 27/04 123/536
5,167,782 A * 12/1992 Marlow .................... C22C 9/04 123/538
5,197,446 A * 3/1993 Daywalt .............. B01J 19/2405 123/538
5,249,552 A * 10/1993 Brooks ................... C10L 10/02 123/1 A
5,307,779 A * 5/1994 Wood ................... F02M 27/045 123/538
5,393,723 A * 2/1995 Finkl ........................ B01J 23/18 123/538
5,451,273 A * 9/1995 Howard .................. C22C 30/02 123/537
5,524,594 A * 6/1996 D'Alessandro ........ F02M 27/02 123/538
5,625,118 A * 4/1997 Finkl ........................ B01J 23/14 123/1 A
5,728,913 A * 3/1998 Finkl ........................ B01J 23/14 123/1 A
5,738,692 A 4/1998 Wright
5,824,209 A * 10/1998 Arand .................... C10G 35/04 208/135
5,881,702 A * 3/1999 Arkfeld .................. F02M 27/06 123/538
6,000,381 A * 12/1999 Berlin .................... B01J 23/681 123/538
6,024,073 A * 2/2000 Butt ....................... F02M 27/02 123/538
6,129,774 A * 10/2000 Owens .................. C10L 1/1208 123/358
6,810,864 B1 * 11/2004 Folk ....................... F02M 27/02 123/538
7,967,876 B2 * 6/2011 Aradi ...................... C10L 1/106 44/354
2002/0139044 A1 * 10/2002 Berlin .................. B01J 23/6445 44/639
2003/0010326 A1 * 1/2003 Arkfeld .................. F02M 27/02 123/538
2012/0067802 A1 * 3/2012 Irvin ..................... B03C 1/0332 210/222
2015/0322354 A1 * 11/2015 Daywalt ................ C10G 11/02 208/74

FOREIGN PATENT DOCUMENTS

GB 2272942 A * 6/1994 ............. F02M 27/00
GB 2317921 A * 4/1998 ............. B60K 15/00
WO 95/16123 6/1995
WO 00/28204 5/2000

OTHER PUBLICATIONS

Written Opinion of the International Searching Authority (in Spanish) related to PCT/PE2016/000022, dated Feb. 28, 2017 (3 pgs.).

* cited by examiner

DEVICE FOR THE TREATMENT AND ELIMINATION OF BACTERIA IN HYDROCARBON FUELS AND PROCESS FOR ITS MANUFACTURE AND SURFACE ACTIVATION

TECHNICAL FIELD

The present invention is within the technical field of chemistry. Specifically, it refers to the use of metal catalysts for the elimination of bacteria in fossil fuels.

STATE OF THE ART

In commercial fuels, there are usually contaminants and microbiological compounds that reduce their efficiency when burned in engines or burners, affecting their performance, cold pumpability, the life of the injection pumps, block the injectors, and eventually reduce combustion efficiency causing loss of power, high soot formation, need to change the lubricating oil and its filter more frequently and the increase of the emissions of toxic gases to the environment.

These contaminants are in good proportion bacteria, molds and yeasts, which grow naturally in such fuels. This growth is usually exponential.

The presence of these microorganisms in the fuel can be detrimental to its performance in burners or engines, in general any process or application involving the burning of these fuels.

This problem occurs from the moment the fuel leaves the refinery until the moment it is burned in the engine, i.e., during the entire logistics chain composed of the transportation from the refinery to the service stations or to the intermediate reservoirs, during its storage in such places and during its storage in the fuel tanks of the vehicles themselves, the fuel will be progressively contaminated.

This microbiological contamination is accelerated when the environment is favorable for the growth of bacteria, for example, in environments of high humidity, temperature or environments contaminated by dusts.

There are different technologies to solve this problem. One is the use of fuel filters. These are usually membranes with small pores through which the diesel is forced to pass by applying pressure, so that impurities, one of them bacteria, remain trapped in the membrane. However, this technology has several shortcomings, such as the need to raise the pressure of the fuel to be able to purify it, which makes the pumping and injection system inefficient; in addition, they have the problem that the size of their pores is usually larger than the size of the bacteria; for example, if there is a filter whose pore size is 10 microns and the bacteria consortia have 0.2 microns in diameter on average, these will not be filtered; it only eliminates bacteria when the pumping system is activated; and these also need to be replaced periodically as they are often saturated or clogged, which also impairs the vehicle's operation.

Another technology that exists to solve this problem are liquid additives, such as commercial products HFA Oil Additives, liqui moly, etc. These are added to the fossil fuel and chemically remove the bacteria in the fuel. These have certain problems, as it is not a permanent treatment, but that an amount of the additive treats a specific volume of fuel; and that the composition of the additive may adversely affect the performance of the fossil fuel.

In addition, there are metal catalysts based on tin and antimony that are installed inside the fuel storage systems and perform the function of constantly treating the fuel in such a way that they eliminate the bacteria that are inside it.

But, these technologies have different problems such as:

Rate of elimination of bacteria:

Current technologies of metal catalysts for the removal of bacteria have a reaction rate, so the improvement effect on the fuel hydrocarbon is appreciated after a considerable time after having come into contact and having initiated the reaction.

Initial increase in fuel contamination at the start of the treatment:

At the start of the treatment, metal catalysts often release oxides and other impurities that act to the detriment of fuel quality. It is after a period of time that these pollutants are removed by the catalyst itself and the bacteria begin to be eliminated.

They generate damages to the fuel container where they are installed:

These devices typically have a reduced volume and are not attached to the container where they are installed. Many times, these are installed inside the fuel tank of moving vehicles. This is why the devices move from side to side and can cause damage to the structure of the container and sensors (level buoys, temperature sensor, etc.) and actuators (pump, valves, etc.) inside of it. Moreover, fixing these devices through mechanical intervention is complicated and dangerous as it would require dismantling the fuel container and handling when it still contains debris, which creates the risk of an explosion.

Ensure the effectiveness of the reaction in any environment:

These catalysts depend on the presence of a ferrous material to begin to react, so if in the environment in which they are such material is not found, its effect will be zero.

Toxicity:

Some patents describe products that include metals such as bismuth, lead, or mercury, which can cause them to be harmful and toxic to people using or handling them.

DESCRIPTION OF THE INVENTION

The purpose of the invention is to eliminate microbiological contaminants present in fuel hydrocarbons more quickly and effectively than existing technologies, being compatible with the engineering of fuel storage tanks and without causing damage to human health.

In this regard, it was developed a device comprising metal pellets composed of an alloy of tin, antimony, copper and zinc; a metal casing, a plurality of magnets and lids. In addition, it was developed a process for the manufacture and activation of pellets, so that their catalytic activity is intensified.

Tin and antimony alloys are used to prevent putrefaction in fossil fuels and in general hydrocarbon fuels, but their antimicrobial activity does not become sufficiently intense to eliminate the bacteria, molds or yeasts that exist in that fluid in an agile and timely way.

For this reason, zinc and copper metals, in addition to tin and antimony, were considered in the composition of the pellet to have a more intense catalytic effect.

The incorporation of copper to this mixture is due to the fact that this metal has bactericidal properties, which causes the alloy to act more intensely to eliminate microorganisms.

In this case, zinc fulfills the function of being a support for the other metals used in the alloy. This metal is a semiconductor that promotes the exchange of electrons and the catalytic activity, magnifying the properties that the other metals that act along with it.

Moreover, the aforementioned process was designed to prevent the metal catalysts from releasing oxides and other impurities detrimental for the quality of the fuel at the start of the treatment, so that when acting on the fuel it generates only positive effects and develop its catalytic activity more vigorously.

This procedure consists of five steps: smelting, pouring, cooling, activation and cleaning.

In the smelting step, the metals are placed in a refractory vessel and are introduced into an oven where they are heated to exceed their melting point.

In the pouring step, the metals are poured into a mold to take their shape into solid state.

In the cooling step, the pellets lose temperature in such a way that their molecular structure is or tends to be crystalline and in a non-oxidizing environment.

In the activation step, the pellets are removed from the mold to be transferred to a vessel containing an organic solvent where they are subject to reflux to activate their surface.

Finally, in the cleaning step, the pellets are removed from the vessel containing the organic solvent to remove all residues thereof by evaporation in an oven.

On the other hand, the invention does not contain metals such as lead or mercury (such as U.S. Pat. Nos. 6,024,073 A and 5,393,723 A), which may have a health risk to persons handling this material.

In addition, the pellets need to be in an environment where there is at least one material that is mainly composed of iron in order to develop their catalytic activity. That is why both the lids of the device and the metal casing must be made of a material that is mainly iron, in order to ensure the effectiveness of the catalytic reaction of the pellets in any environment in which they are installed. In addition, this material should preferably be stainless.

Additionally, the incorporation of magnets into the metal casing will allow the device to adhere to any surface that is attracted by magnets, for example the iron, which is the material from which most fuel tanks are manufactured. This will prevent the device from being loose and moving through the fuel tank, while avoiding damage to sensors and actuators that may be inside it.

LIST OF FIGURES

The present invention shows the figures describing the invention:

FIG. 1: Assembled device for the treatment and disposal of bacteria in fossil fuel.

1: Device

Figure 2:
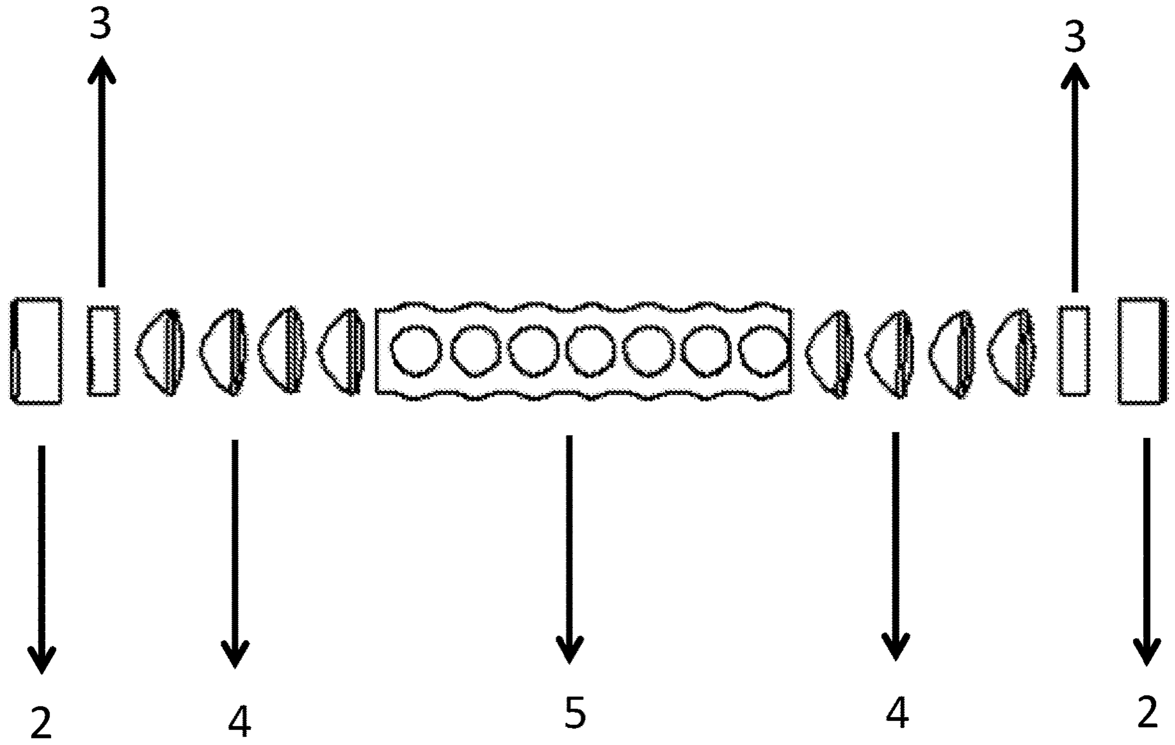

FIG. 2: Parts of the device for the treatment and disposal of bacteria in fossil fuels.

2: Lid

3: Magnets

4: Pellets

5: Casing

Figure 3:
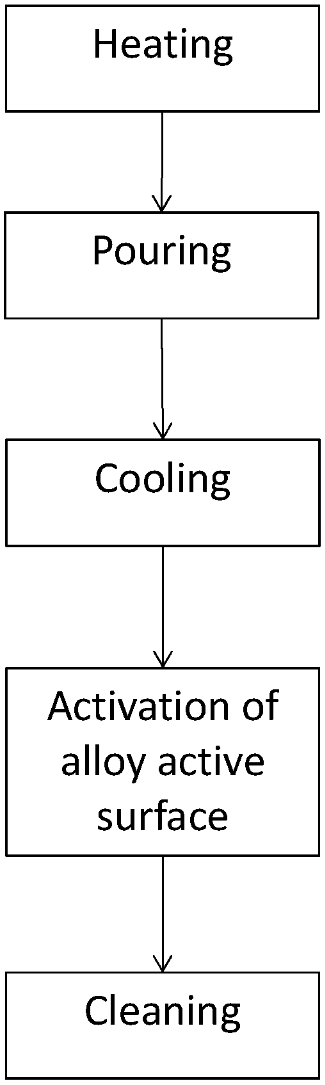
Figure 4:
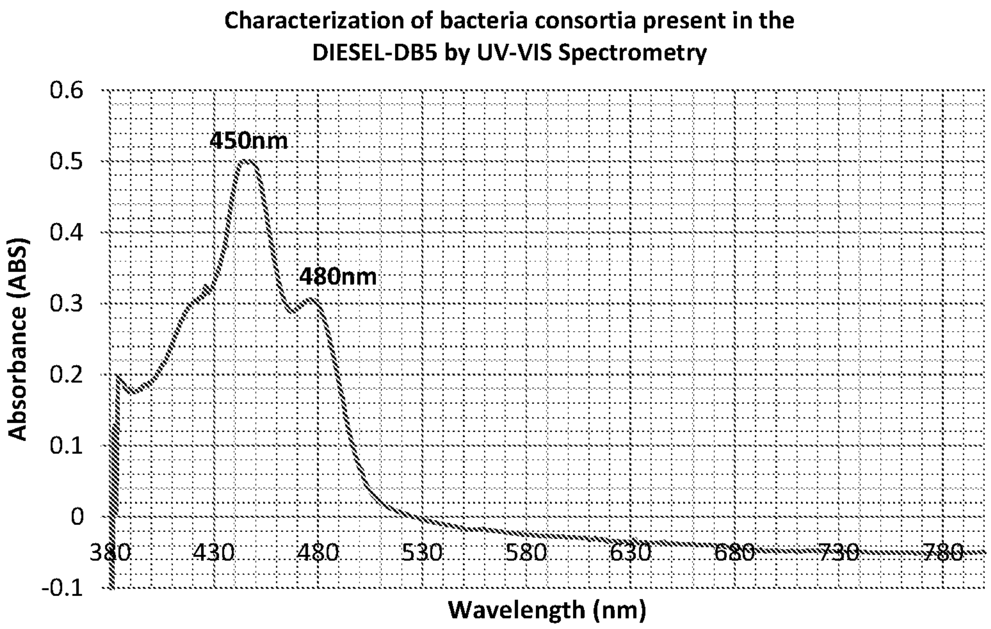

FIG. 3: Block diagram of the process for the manufacture and activation of metallic pellets FIG. 4: Characterization of bacterial consortia present in DIESEL-DB5 by UV-VIS Spectrometry FIG. 5: Comparison of different alloys with respect to bacterial degradation measured at a wavelength of 450 nm FIG. 6: Comparison of different alloys with respect to bacterial degradation measured at a wavelength of 480 nm

PREFERRED DESCRIPTION OF THE INVENTION

The invention is a system for the elimination of bacteria in fossil fuels comprising a plurality of metallic pellets composed of an alloy whose composition is as follows:

| | |
|---|---|
| Tin | (Sn): Between 45% and 55% |
| Antimony | (Sb): Between 20% and 30% |
| Copper | (Cu): Between 10% and 20% |
| Zinc | (Zn): Between 5% and 15% |

This alloy was designed not to cause harm to human health and, in turn, to overcome the efficiency of the catalysts for the elimination of bacteria made from antimony, tin, lead and mercury. Therefore, it was decided not to use metals such as lead and mercury, as these are the most harmful to human health, other elements that can replace them to generate greater catalytic activity were analyzed.

Different hypotheses to find the elements that complete the alloy were raised, the most promising metals being copper and zinc. The first one for its bactericidal properties and the second one because it is an element that acts as a support which magnifies the catalytic properties of the other elements or compounds acting along with it.

To analyze the effects of these metals on the fuel, pieces of both were immersed in separate samples of biodiesel in glass flasks for 4 weeks to carry out a visual inspection and the measurement of their absorbance at different wavelengths by means of UV-VIS spectrometry.

It should be clarified that the bacteria that contaminate fuels are mainly *pseudomonas* in consortium, which can be indirectly detected and quantified by measuring the absorbance at different wavelengths by UV-VIS spectrometry of the fuel they grow. Bacterial consortia are detected by the presence of two characteristic peaks in the absorbance plot at 450 nm and 480 nm wavelength. The following graph shows the characteristic peaks seen in FIG. 4.

Continuing the analysis of zinc and copper, it was observed that zinc had no effect on fuel and copper had a negative effect, as biodiesel became cloudy and denser. With respect to the measurement of their absorbances, none achieved to significantly reduce the characteristic peaks. In that sense, they had no bactericidal effect on the fuel individually.

Then, it proceeded to the validation of the hypothesis that the effect of copper, zinc, antimony and tin as a whole will have a more intense catalytic effect than the other alloys. For this, pellets of the same size and different composition were prepared to analyze the difference that is generated when adding the two metals proposed. The first sample consisted of approximately 33% of antimony and 67% of tin and the second one according to the ratio expressed previously.

In order to perform the analysis, bacteria were grown in a biodiesel sample by insertion of a *pseudomonas* culture, subjecting it to heating and bubbling oxygen for two months. In this way, it was possible that the biodiesel became dark, evidencing the presence of bacteria.

The biodiesel sample was then separated into two glass containers with two connections for coupling a hose. In this way, hoses were coupled to the inlets and outlets of the containers. In addition, vessels of cylindrical form of ferrous material were made, where the pellets of the different alloys were inserted. These containers had lids and nipples that allow them to be installed in a serial way on the hose, so that the fuel can flow through the inside. Commercial fuel pumps were also installed in series so that they could pump and recirculate the fuel in the proposed system.

The test was started by turning on the fuel pump and the absorbance was measured every ninety minutes to quantify the effect of the alloys on the fuel.

To understand how the bacteria are eliminated, it should be mentioned that these disappear with a rate described by the following function:

$$N_{(t)}=N_0 e^{-a\cdot t}$$

Where:

$N_0$: Total number of bacteria at the beginning of time (t=0).

$N_{(t)}$: Total number of bacteria at the beginning in a given time (t≠0).

a: Inverse time constant ($s^{-1}$).

t: time in seconds.

On the other hand, to quantify bacterial removal, it was used, as previously mentioned, the UV-VIS spectrometry method based on the Beer-Lambert Law, which is an empirical relation that relates the absorption of light with the properties of the material traversed.

$$A=\alpha\cdot L\cdot C$$

Where:

A: Absorbance.

L: Length traversed by light in the middle (cm).

C: Concentration of the absorbent in the medium (M; # mol/L).

α: Absorption coefficient (L×# $mol^{-1}$×$cm^{-1}$; L×# $mol^{-1}$× $m^{-1}$)

Both the total number of bacteria "N" and the concentration of the absorbent "C" depends on the mass; this may be related as directly proportional, then the absorbance "A" would have a ratio directly proportional to the number of "N" bacteria:

$$N\propto C\rightarrow N\propto A$$

Using the three equations, we would have the following expression:

$$A_{(t)}=A_0\cdot B\cdot e^{-a\cdot t}$$

$$\boxed{\frac{A_{(t)}}{A_0}=B\cdot e^{-a\cdot t}}$$

Where:

$$\frac{A_{(t)}}{A_0}\propto\frac{C_{(t)}}{C_0}\propto\frac{N_{(t)}}{N_0}:$$

Ratio of number of bacteria at time "t".

B: Non-dimensional coefficient.

a: Inverse time constant ($s^{-1}$).

t: time in seconds.

In order to graph the results obtained, the Naperian logarithm "Ln" was calculated to give linearity to the function and to eliminate the time factor "t".

$$\underbrace{\ln\left(\frac{A_0}{A_{(t)}}\right)}_{Y''}=a\cdot t-\ln(B)$$

$$\boxed{Y''=a\cdot t-\ln(B)}$$

This is how the potential function $$\ln\left(\frac{A_0}{A_{(t)}}\right)$$

vs t is plotted, obtaining the equation of a straight line.

Figure 5:
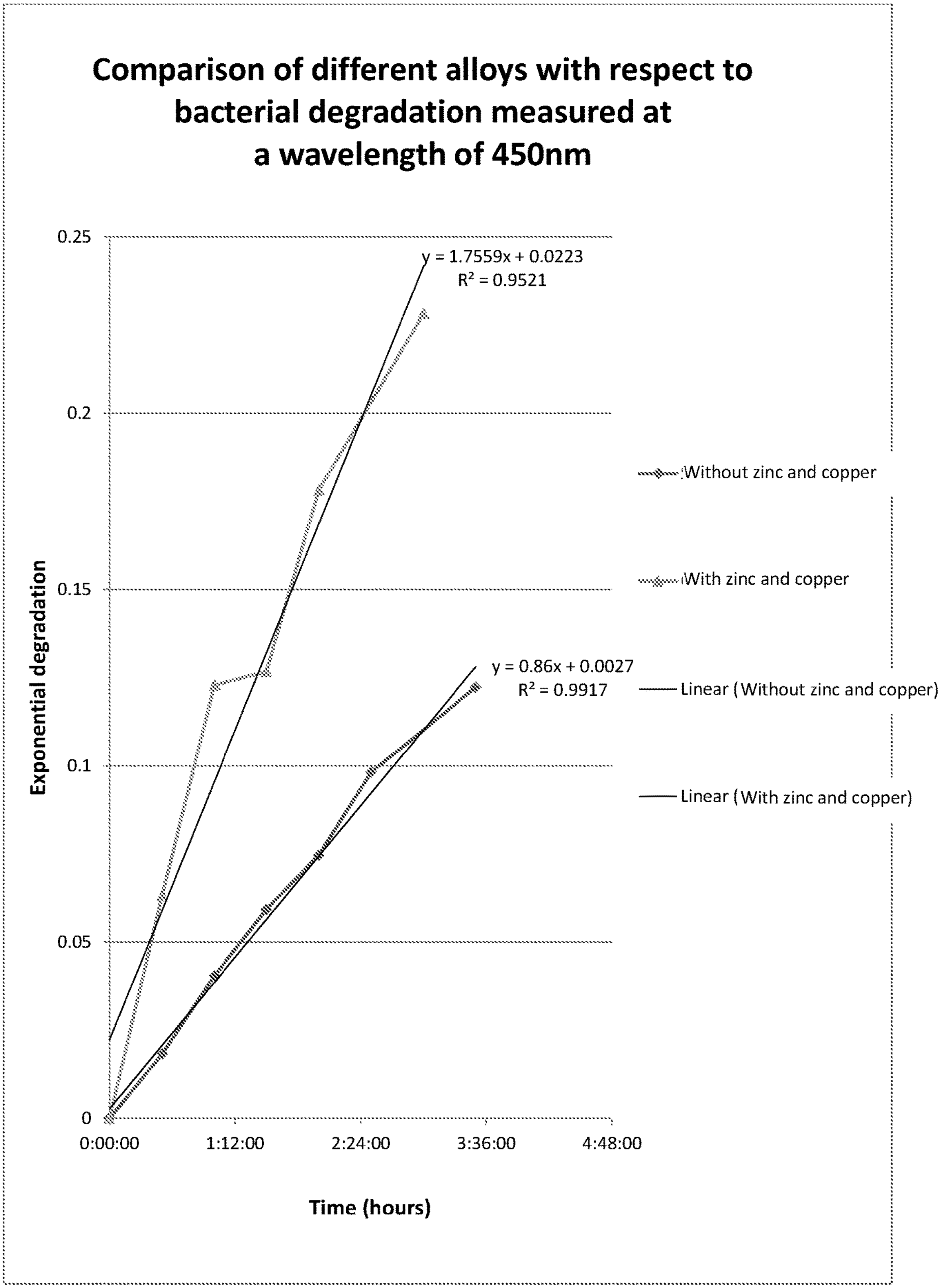
Figure 6:
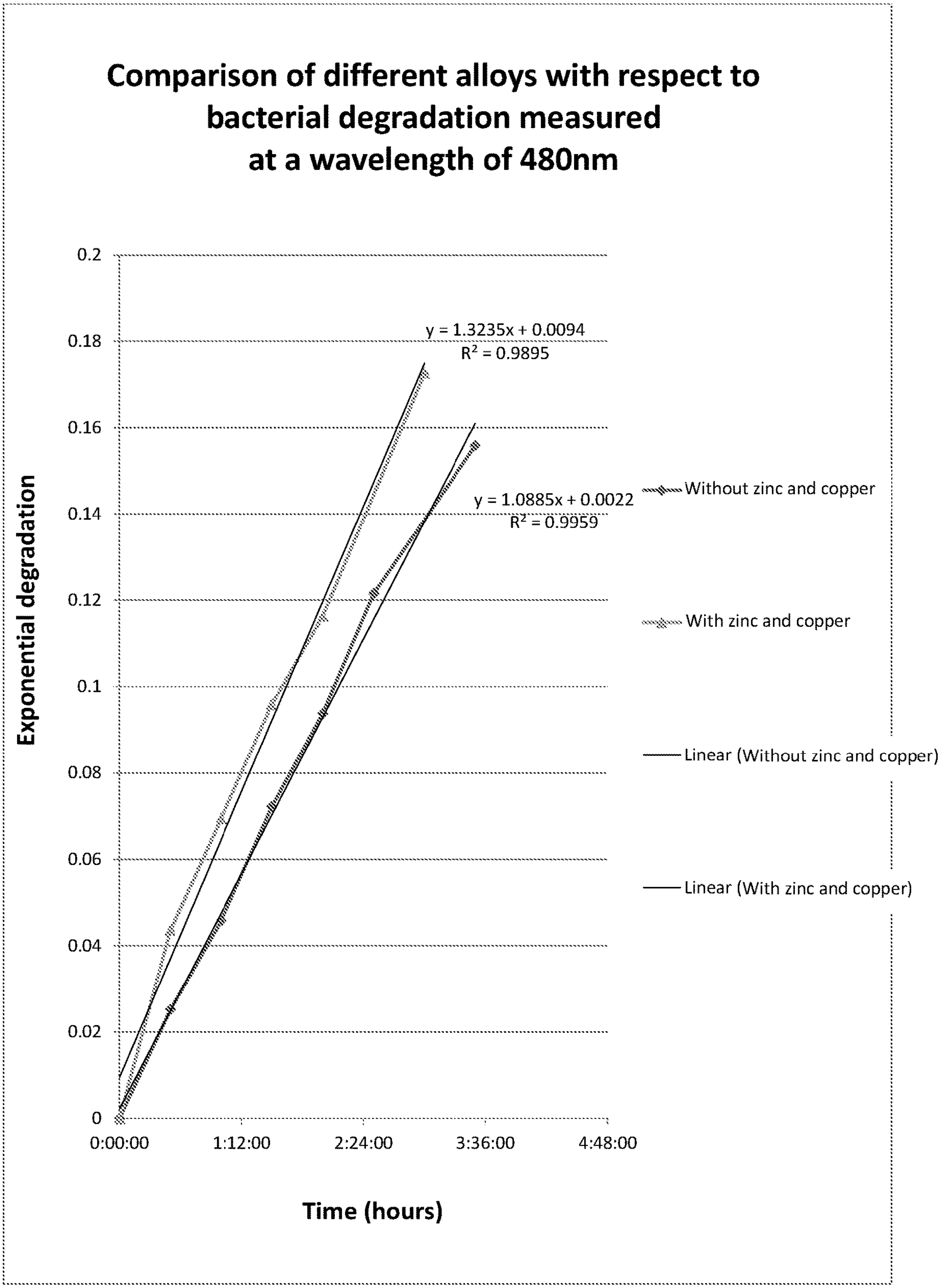

In this way, the results are shown in the graphs of FIGS. 5 and 6.

In this way, it was possible to determine that the catalytic effect on the elimination of microorganisms is intensified by mixing these metals in the mentioned proportions.

Moreover, the geometry and size of the alloy can be of different shapes and sizes, such as foam, pellets (4), spheres of different sizes, nano or micro structures, among others, provided that it is ensured that it can be in contact with the fuel and that its mechanical resistance allows the fuel flow to be supported without being broken or detached. The alloy must be contained within the metal casing.

In addition, the metal alloy has a catalytic effect because it must close an electrochemical circuit similar to that of a battery or a sacrificial anode. This is composed of the alloy, the fuel and a metal or alloy whose main element is iron. Generally, it is expected that this circuit can be closed by the material from which the fuel storage tank is formed, since generally the cars usually have a low carbon steel tank, but in other cases, such as cement, plastic tank (used on jet skis, light cars, among other vehicles) the circuit will not necessarily be closed, preventing catalytic activity for the elimination of bacteria. This is why the casing (5) must be metallic and the main element of its alloy must be iron, in order to ensure that the circuit is complete and that the elimination of bacteria is ensured in any environment in which it is installed. Likewise, this material should preferably be stainless in order to avoid the formation of rust on its surface while being stored or transported prior to being installed within a fuel storage tank.

The casing (5) may have different geometries such as hexagonal, octagonal, cylindrical, etc. Something important is that it has holes through which the fuel can flow into it and can be in contact with the alloy. These can also be of different geometry.

On the other hand, the device (1) must be installed inside fuel tanks, which may be stationary, as they may belong to vehicles that will be in motion. In that sense, being a non-negligible element, it could move inside the tank as the vehicle accelerates, turns, changes its inclination or brake, being able to collide with the walls and with different sensors or actuators (such as level sensors or pumps) causing damage. Bolting the device to the base of the tank can be complicated and dangerous (due to the presence of flammable gases) and, in turn, can weaken the structure of the fuel tank, making it less resistant to shock, which would also imply an effect negative on the safety of the operation of the fuel storage tank, which would be critical in the case of those installed in vehicles that move and transport people. This is why in the present design magnets (3) are incorporated into the casing (5) to make the device (1) able to adhere to the surfaces of which the fuel tanks are usually composed. In this way, it can be fast and securely fastened to reduce the risk of damaging the fuel tank or its internal parts.

Finally, the ends of the device (1) are sealed with lids (2), which must be clamped under pressure or welded to the casing to ensure they are not loose.

It should be noted that the scope of this invention is not limited to a particular fuel, but can be applied to any fuel which is a liquid or gaseous hydrocarbon.

Likewise, a process for the preparation of the alloy and the activation of its active surface has been invented. It comprises the following steps: heating, pouring, cooling, activation and cleaning.

In the heating step, the temperature of the metals comprising the alloy is raised above 1000° C., surpassing their melting points. Thus, when metals are inside the refractory vessel, they pass from the solid state to the liquid state. The heating should preferably be carried out in an inert atmosphere, for example, in an argon gas atmosphere, in order to avoid the formation of oxides.

In the next step of pouring, the metal alloy is poured into a mold to proceed to take the desired shape. As mentioned above, this form can be spherical, of pellets (4), meshes, foam, among others. It is important that the mold in which the pouring is made has the ability to remove the heat from the alloy sufficiently and be at a temperature not above 200° C. from the atmospheric, since the alloy must have an atomic structure preferably crystalline at the time of solidification because in this way its catalytic effect is intensified.

Once the alloy is solidified, it is removed from the mold and transferred to a vessel with oil or a non-oxidizing liquid to accelerate its cooling and to provide an oxygen-free environment to prevent the generation of oxides on its surface. This helps that there are no oxide particles that disrupt the catalytic effect of the alloy.

Subsequently, the alloy is activated. The oil on the surface is removed and the alloy is transferred to a vessel formed of a ferrous metal material or containing an element of the same characteristics, where the liquid hydrocarbon fuel, preferably diesel, is contained and refluxed to start the chemical reaction and that the surface of these is activated, releasing all the metal oxides that may have been formed on the surface of the alloy. This ensures that the effect of the alloy on the fuel is optimized, avoiding the release of possible contaminants.

Finally, the pellets are removed from the vessel in which they were activated and are transferred to a stove, so that they can be cleaned, evaporating the remaining solvent that may have remained on its surface.

The invention claimed is:

1. A device for the treatment and disposal of bacteria in combustible hydrocarbons comprising a casing containing a metal alloy, characterized in that said metal alloy consists of the following metals in the respective proportions by weight:

| | |
|---|---|
| Tin | (Sn): 45%-55%, |
| Antimony | (Sb): 20%-30%, |
| Copper | (Cu): 10%-20%, |
| Zinc | (Zn): 5%-15%. |

2. The device for the treatment and elimination of bacteria in combustible hydrocarbons according to claim 1, characterized in that the casing has ends, and the ends have lids.

3. The device for the treatment and elimination of bacteria in combustible hydrocarbons according to claim 1, characterized in that the casing contains magnets.

4. The device for the treatment and elimination of bacteria in combustible hydrocarbons according to claim 1, characterized in that the casing is made of a material whose principal component is iron and is stainless.

5. The device for the treatment and elimination of bacteria in combustible hydrocarbons according to claim 1, characterized in that the casing has holes.

6. The device for the treatment and elimination of bacteria in combustible hydrocarbons according to claim 1, characterized in that the metal alloy has a pellet, spherical or nanostructure form.

7. A process for the manufacture and activation of a metal alloy as part of a device for the treatment and elimination of bacteria in combustible hydrocarbons, characterized in that the process is composed of the following steps:

(a) smelting a mixture of metals consisting of the following proportions by weight: 45% to 55% tin, 20% to 30% antimony, 10% to 20% copper, 5% to 15% zinc;

(b) pouring the mixture of metals smelted into a mold, obtaining the metal alloy;

(c) allowing the metal alloy to stand in a non-oxidizing environment until cooling;

(d) activating the metal alloy surface introducing said metal alloy in a vessel containing at least one organic solvent;

(e) cleaning the metal alloy through evaporation by heating until residues of at least one organic solvent from step (d) are removed.

8. The process for the manufacture and activation of a metal alloy according to claim 7, characterized in that in step (a), the mixture of metals is contained in a refractory vessel and is heated, in an inert atmosphere at a temperature above 1000° C.

9. The process for the manufacture and activation of a metal alloy according to claim 7, characterized in that in step (b), a temperature of the mold must be lower than the metal mixture temperature and not exceeding an atmospheric temperature by more than 200° C.

10. The process for the manufacture and activation of a metal alloy according to claim 7, characterized in that in step (c), the metal alloy is transferred to a vessel containing oil, allowing the metal alloy to stand for reducing the metal alloy temperature until room temperature.

11. The process for the manufacture and activation of a metal alloy according to claim 7, characterized in that in step (d), the vessel is made of a ferrous and stainless material, and the at least one organic solvent is a combustible hydrocarbon; wherein the metal alloy is subjected to stirring for a period of time higher than 10 hours at room temperature.

12. The process for the manufacture and activation of a metal alloy according to claim 7, characterized in that in step (e), the metal alloy is drained and transferred to an oven and subjected to a slight heating for evaporating the residues of the organic solvent.

* * * * *